Patented June 18, 1940

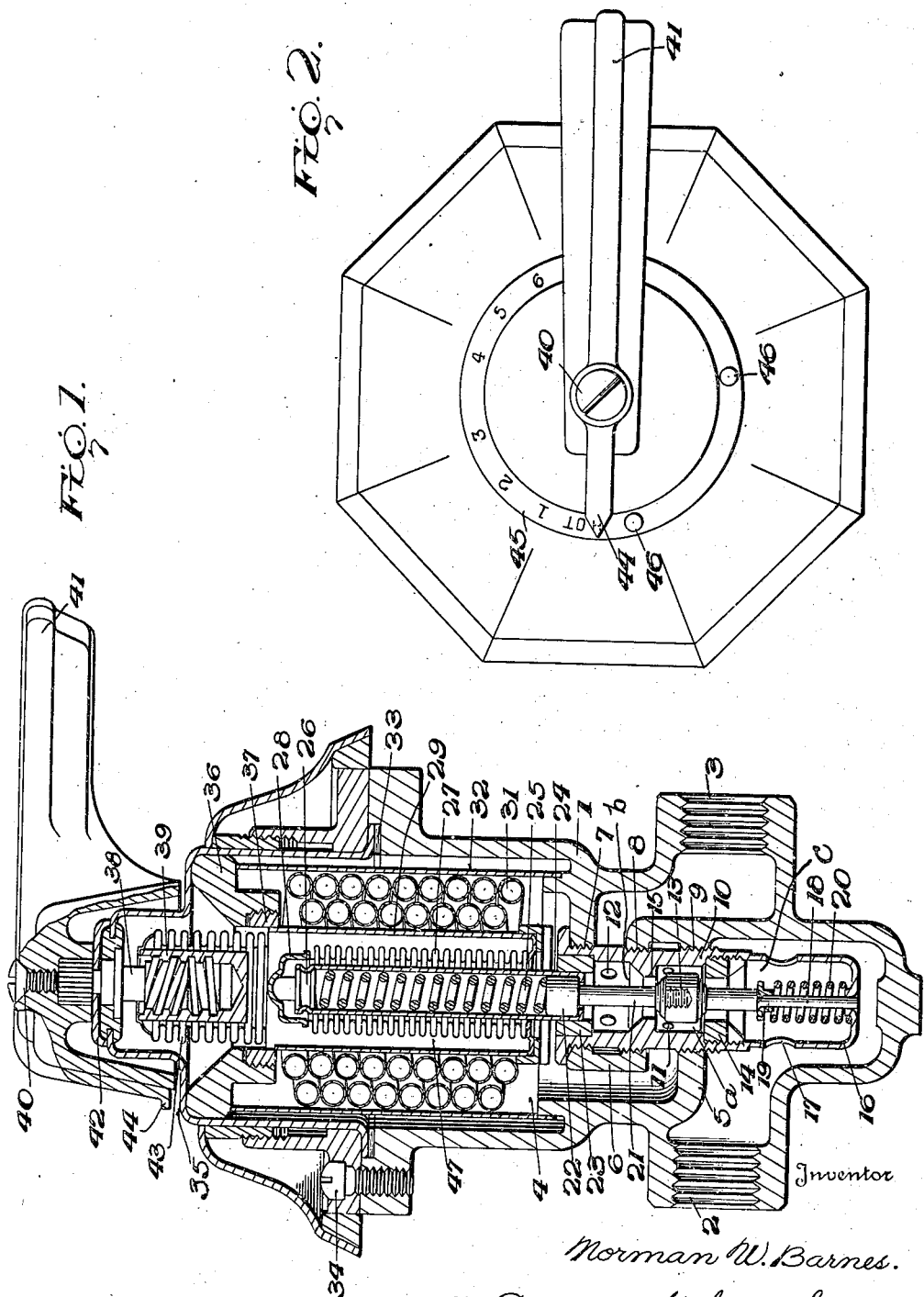

2,205,334

UNITED STATES PATENT OFFICE 2,205,334

MIXING DEVICE

Norman W. Barnes, Knoxville, Tenn., assignor to The Fulton Sylphon Company, Knoxville, Tenn., a corporation of Delaware Application February 4, 1937, Serial No. 124,129

2 Claims. (Cl. 236—12)

This invention pertains to improvements in mixing devices for hot and cold water or other suitable fluids, and is directed specifically to a mixing device of this type in which the mixture may be kept at a desired temperature thermostatically.

One object of this invention is to provide a novel mixing device wherein it is necessary to utilize only one valve member.
Another object of this invention is to provide a novel mixing device in which the mixture may be kept at a desired temperature by improved thermostatic means.

Another object of this invention is to provide improved manually adjustable means whereby the temperature of the mixture may be regulated and when set the temperature will be maintained constant by thermostatic means.

Other and further objects of the invention will appear as this specification proceeds.

In the drawing:

Fig. 1 is a section of a preferred embodiment of the mixing device; and

Fig. 2 is a top view of the mixing device to show a suitable calibrated index and manually adjustable handle for regulating the temperature of the mixture of hot and cold water or other fluids.

In the form shown in Fig. 1, valve body or casing I, of any suitable size, construction and material, is illustrated as having oppositely disposed screw-threaded nipples 2 and 3 adjacent one end thereof. Screw-threaded nipples 2 and 3 are adapted to receive the threaded ends of hot and cold water pipes, respectively, and are illustrated as separated from each other and from mixing chamber 4, also within the valve body, by suitable partitions 5 and 6 in valve body I. Partitions 5 and 6 may be made integral with valve body I, as illustrated, as by casting, and contain suitable apertures 7, 8 and 9 which may be screw-threaded to receive valve seat insert 10.

Valve seat insert 10 contains related chambers a, b and c which may be of any suitable size and shape and which are separated by interior partition walls ported to provide valve seats 14 and 15. Chamber a has its wall suitably perforated as at 11 so that communication is provided between chamber a and mixing chamber 4. Chamber b also has its wall suitably perforated as at 12 so that it communicates with cold water nipple 3, and it also communicates with chamber a through a valve port hereinafter referred to. Chamber a contains poppet or valve member 13 of any suitable construction and material and which may seat either on valve seat 14, here shown as provided on an annular member which is suitably retained within valve seat insert 10 as by screw threads, or on valve seat 15 here shown as suitably formed on the integral partition wall between chambers a and b. Suitably attached to valve seat insert 10, as by brazing, screw threads, or otherwise, and thereby forming a part thereof, is spring cage member 16 of any suitable material and design and which is perforated as at 17 to allow hot water from nipple 2 to enter the chamber c in the interior of valve seat insert 10.

Slidably mounted in cage member 16 is valve stem 18 of poppet 13, which carries spring seat 19. Spring 20 surrounds valve stem 18 and reacts between spring seat 19 and the cage member 16 in such manner as to tend to force poppet 13 toward valve seat 15 and cut off the flow of cold water from nipple 3 into chamber a. Suitably attached to poppet 13, as by screw threads, is valve stem 21 of any suitable design and which carries at its extremity a suitable plug 22. Plug 22 projects though the aperture in ring 23 which is brazed or otherwise secured within valve seat insert 10, and reciprocatingly mounted in said aperture is one end of spring tube 24 which is of any suitable construction and which may also slide over plug 22. Positioned within spring tube 24 is spring 25 which reacts between plug 22 and a second plug 26, which is suitably held in the extremity of spring tube 24 as by crimping, in such manner as to tend to force plug 22 against the flanged end of tube 24.

Surrounding spring tube 24 is expansible and contractible member 27 which may be of any suitable design and material. Brazed or affixed in any suitable manner to the extremity of expansible and contractible member 27 is head 28 which bears against plug 26 in such a manner that a pressure exerted on head 28 will cause a corresponding movement of spring tube 24 which will be transmitted through spring 25 to valve stem 21 and thence to poppet 13. Surrounding expansible and contractible member 27 in such manner as to form a fluid-tight enclosure therewith is rigid tubular wall 29 of any suitable shape and material which is held in position by a suitable assembly ring 37 and which constitutes the inner wall of mixing chamber 4.

Coiled or otherwise positioned about casing 29 in mixing chamber 4 is pipe 31 which communicates with the space between expansible and contractible member 27 and member 29. Said coiled pipe 31 and the space between expansible and contractible member 27 and member 29 are filled with a suitable thermosensitive liquid which is sensitive to temperature changes within mixing chamber 4. A suitable wall 32 surrounds coiled pipe 31 and is brazed or otherwise affixed to valve body 1 so as to form a water-tight enclosure within valve body 1, said wall 32 constituting the outer wall of mixing chamber 4.

Suitably affixed to valve body 1, as by one or more screws 34, and with interposed gasket 33, is bonnet member 35 of any suitable shape and construction. Within bonnet member 35 is member 36 which contains said screw-threaded plug 37 to which member 29 is suitably attached. Rotatably mounted on member 35 but held against axial movement is adjusting stem 38 which is externally screw-threaded at its inner end and engages internal threads in adjusting block 39. Handle 41 is mounted on adjusting stem 38 in any suitable way, as by screw 40, in such manner that clockwise rotation of handle 41 will cause upward movement of adjusting block 39. Leaf spring 42 is carried by member 35 and reacts between said member and said handle in such manner as to prevent loose play of said handle.

A second expansible and contractible member or bellows 43 is suitably affixed at one end to adjusting block 39, as by brazing, and has its opposite extremity suitably secured as by brazing, to the end of casing 29 so as to constitute a flexible and fluid-tight extension of the chamber between expansible and collapsible member 27 and member 29.

Handle 41 carries suitable pointer means 44 which registers with a suitable scale 45 carried by bonnet member 35.

From the mixing chamber 4 suitable outlet means (not shown) lead to the shower spray or other distributing means.

Referring to Fig. 2, there is illustrated a top plan of the mixing device showing adjusting handle 41, with its pointer 44 registering with index 45. Suitable stop pins 46 may limit the amount of clockwise or counterclockwise movement of adjusting handle 41 to prevent too great a compression or expansion of expansible and contractible member 43. Index 45 may be attached to the upper portion of bonnet member 35 in any suitable manner so that pointer 44 of adjusting handle 41 will suitably register therewith.

The device functions as follows: Hot water from pipe or other source joining nipple 2 passes through the apertures 17 in cage 16 into valve seat insert 10, and past poppet 13 through the apertures 11 in chamber $a$ into mixing chamber 4. Cold water from pipe or other source joining nipple 3 passes through apertures 12 in the wall of chamber $b$ into valve seat insert 10, past poppet 13 into chamber $a$ and into the mixing chamber through apertures 11. When the heat of this mixture expands the thermosensitive liquid in coiled pipe 31 and in the expansible and contractible chamber 47 defined between expansible and collapsible member 27 and member 29, head member 28 is depressed, valve stem 21 is forced inwardly, and poppet 13 is forced toward seat 14, against the tension of spring 20, to decrease the flow of hot water from nipple 2 and increase the flow of cold water from nipple 3. When the mixture becomes cooler there is a corresponding contraction in the thermosensitive liquid in coiled pipe 31 and in the expansible and contractible chamber 47, and expansible and contractible member 27 expands under the action of spring 20, moving valve stem 21 outwardly, and forcing poppet 13 toward seat 15 to increase the flow of hot water from nipple 2 and decrease the flow of cold water from nipple 3.

If a hotter mixture is desired, adjusting handle 41 is turned in a clockwise direction to the temperature desired as indicated by index 45. This clockwise movement of adjusting handle 41 causes an outward movement of adjusting block 39 and expansion of bellows 43, decreasing the pressure in chamber 47 and allowing expansible and contractible member 27 to expand under the action of spring 20. This expansion of expansible and contractible member 27 raises valve stem 21 and poppet 13, decreasing the flow of cold water from nipple 3 into mixing chamber 4 and allowing an increased flow of hot water from nipple 2 into the mixing chamber 4 to increase the temperature of the mixture.

If a cooler mixture is desired, adjusting handle 41 is turned in a counterclockwise direction to the cooler temperature desired. This counterclockwise movement of adjusting handle 41 causes an inward movement of adjusting block 39 and contraction of bellows 43, increasing the pressure in chamber 47 and contracting expansible and contractible member 27 against the tension of spring 20. This contraction of expansible and contractible member 27 forces valve stem 21 and poppet 13 inward, decreasing the ingress of hot water from nipple 2 into the mixing chamber 4. At the same time the passage is increased for cold water from nipple 3 into the mixing chamber 4. Thus, the temperature of the mixture is lowered.

If the temperature of the mixture becomes higher than the setting on index 45 at any time, the increased temperature expands the liquid in coiled pipe 31 and expansible and contractible chamber 47 and expansible and contractible member 27 is forced to contract. Thus the poppet 13 is forced toward valve seat 14 and the flow of hot water is decreased or cut off and the flow of cold water from nipple 3 into the mixing chamber 4 is increased until the temperature of the mixture becomes that predetermined by the setting of the handle 41.

The converse is true when the temperature of the mixture becomes colder than the setting. In such case the thermosensitive liquid in coiled pipe 26 and expansible and contractible chamber 47 contracts and expansible and contractible member 27 expands, valve stem 21 and poppet 13 are raised, decreasing the flow of cold water from nipple 3 and increasing the flow of hot water into the mixing chamber 4 to raise the temperature of the mixture to that predetermined by the setting of the handle 41.

Spring tube 24, which may slide over plug 22, and spring 25 prevent damage to expansible and contractible member 27 if under any circumstances the temperature of the mixture in mixing chamber 4 continues to rise after poppet 13 is completely seated on valve seat 14. Such further rise in temperature of the mixture causes continued compression of expansible and contractible member 27 and spring tube 24 may slide over plug 22 against the tension of spring 25 until the pressure ceases to rise. As the pressure in chamber 47 decreases, spring 25 moves tube 24 back to its normal relationship as shown on the drawing.

Thus, it is evident that with the present invention the mixture is at all times maintained at the temperature predetermined by the setting of the thermostat constituted by coiled pipe 31 and expansible and collapsible chamber 47, said temperature being accurately controlled by the adjustment of the valve member 13 with respect to its seats 14 and 15 under the action of said thermostat.

While the embodiment illustrated on the drawing has been described with considerable particularity, it is to be expressly understood that the invention is susceptible of many embodiments without departing from the spirit of the invention, and reference is therefore to be had to the appended claims for a definition of the invention.

What is claimed is:

1. In a fluid mixer, the combination of a valve casing provided with hot and cold fluid inlets and a mixture outlet, said valve casing also including a mixing chamber, partitions within said casing separating said hot and cold fluid inlets from said mixing chamber, a pair of opposed valve seats defining an intermediate chamber in communication with said mixing chamber, a single valve member within said intermediate chamber adapted to cooperate with both of said valve seats and constituting the sole means for regulating the flow from said hot and cold fluid inlets into said mixing chamber, thermostatic means including an expansible and contractible chamber for controlling said valve member disposed within said mixing chamber, means operatively connecting said expansible and contractible chamber with said valve member and means for adjusting said thermostatic means including an expansible and collapsible member attached at one end to said chamber and extending beyond the same to provide an expansible and collapsible extension thereof, said extension having a movable end wall, and means including a handle readily accessible from the exterior of said valve casing and having a threaded connection with said movable end wall for expanding and collapsing said extension to vary the volume of said chamber.

2. In a fluid mixer, the combination of a valve casing provided with hot and cold fluid inlets and a mixture outlet, said valve casing also including a mixing chamber, partitions within said casing separating said hot and cold fluid inlets from said chamber, a pair of opposed valve seats defining an intermediate chamber in communication with said mixing chamber, a single valve member within said intermediate chamber and adapted to cooperate with both of said valve seats and constituting the sole means for regulating the flow from said hot and cold fluid inlets into said mixing chamber, and thermostatic means for controlling said valve member disposed within said mixing chamber and operatively connected to said valve member, said thermostatic means including a rigid tubular member, an expansible and collapsible member within said rigid member and forming an expansible and collapsible chamber therewith, a coiled pipe surrounding said rigid member and communicating with said expansible and collapsible chamber, said pipe and said chamber being filled with a thermo-sensitive liquid, and means for adjusting said thermostatic means including an expansible and collapsible member attached at one end to said rigid member and extending beyond the same to provide an expansible and collapsible extension thereof, said extension having a movable end wall, and means including a handle readily accessible from the exterior of said valve casing and having a threaded connection with said movable end wall for expanding and collapsing said extension to vary the volume of said chamber.

NORMAN W. BARNES.